United States Patent
Garcia Castro et al.

(10) Patent No.: US 11,667,864 B2
(45) Date of Patent: Jun. 6, 2023

(54) LUBRICANTS WITH A TERPOLYMER MADE OF DIESTER, OLEFIN AND ACRYLATE

(71) Applicant: BASF SE, Ludwigshafen am Rhein (DE)

(72) Inventors: Ivette Garcia Castro, Ludwigshafen am Rhein (DE); Wolfgang Grabarse, Ludwigshafen am Rhein (DE); Jan Strittmatter, Ludwigshafen am Rhein (DE); Markus Scherer, Ludwigshafen am Rhein (DE); Karolin Monz, Ludwigshafen am Rhein (DE); Rene Koschabek, Ludwigshafen am Rhein (DE)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 17/286,222

(22) PCT Filed: Oct. 8, 2019

(86) PCT No.: PCT/EP2019/077198
§ 371 (c)(1),
(2) Date: Apr. 16, 2021

(87) PCT Pub. No.: WO2020/078770
PCT Pub. Date: Apr. 23, 2020

(65) Prior Publication Data
US 2021/0348079 A1 Nov. 11, 2021

(30) Foreign Application Priority Data
Oct. 16, 2018 (EP) .................................. 18200690

(51) Int. Cl.
| C10M 107/28 | (2006.01) |
| C08F 220/18 | (2006.01) |
| C08F 210/14 | (2006.01) |
| C08F 222/14 | (2006.01) |
| C10M 107/10 | (2006.01) |
| C10N 20/00 | (2006.01) |
| C10N 20/04 | (2006.01) |
| C10N 30/02 | (2006.01) |
| C10N 30/10 | (2006.01) |
| C10N 20/02 | (2006.01) |

(52) U.S. Cl.
CPC ......... C10M 107/28 (2013.01); C08F 210/14 (2013.01); C08F 220/1804 (2020.02); C08F 220/1808 (2020.02); C08F 220/1812 (2020.02); C08F 220/1818 (2020.02); C08F 222/14 (2013.01); C10M 107/10 (2013.01); C10M 2205/0285 (2013.01); C10M 2209/0845 (2013.01); C10M 2209/0863 (2013.01); C10N 2020/011 (2020.05); C10N 2020/02 (2013.01); C10N 2020/04 (2013.01); C10N 2030/02 (2013.01); C10N 2030/10 (2013.01)

(58) Field of Classification Search
CPC .............. C10M 107/10; C10M 107/28; C10M 2205/0285; C10M 2209/0845; C10M 2209/0863; C08F 210/14; C08F 220/1804; C08F 220/1808; C08F 220/1812; C08F 220/1818; C08F 220/14; C10N 2020/02; C10N 2020/04; C10N 2030/02; C10N 2030/06; C10N 2030/10
See application file for complete search history.

(56) References Cited

U.S. PATENT DOCUMENTS

| 2,892,790 | A | * | 6/1959 | Stuart et al. | C08F 220/1818 526/329.2 |
| 3,720,636 | A | * | 3/1973 | Wollner | C08F 222/14 524/297 |
| 4,359,325 | A | * | 11/1982 | Dawans | C10L 1/1966 524/556 |
| 4,526,950 | A | * | 7/1985 | Grava | C08F 210/14 526/272 |
| 4,839,074 | A | * | 6/1989 | Rossi | C10M 145/02 508/475 |

(Continued)

FOREIGN PATENT DOCUMENTS

| WO | WO-2016083130 A1 | * 6/2016 | ............ C08F 210/14 |
| WO | 2018/007375 A1 | 1/2018 | |
| WO | 2018/024563 A1 | 2/2018 | |

OTHER PUBLICATIONS

European Search Report for EP Patent Application No. 18200690.8, dated Mar. 27, 2019, 3 pages.

(Continued)

*Primary Examiner* — James C Goloboy
(74) *Attorney, Agent, or Firm* — Faegre Drinker Biddle & Reath LLP

(57) ABSTRACT

Lubricants with a terpolymer made of diester, olefin and acrylate The invention relates to a lubricant comprising a terpolymer which comprises in polymerized forma diester selected from di($C_4$-$C_{22}$ alkyl)ester of maleic acid, fumaric acid, 2-methylmaleic acid, 2,3-dimethylmaleic acid, 2-methylfumaric acid, 2,3-dimethylfumaric acid, or mixtures thereof, an olefin selected from $C_6$-$C_{40}$ alky-1-ene, and an acrylate selected from $C_4$-$C_{40}$ alkyl (meth)acrylate. The invention further relates to the terpolymer, a process for preparing the terpolymer comprising the step of polymerizing the diester, the olefin, and the acrylate; and to a method for reducing friction between moving surfaces comprising the step of contacting the surfaces with the lubricant or with the terpolymer.

18 Claims, No Drawings

(56) References Cited

U.S. PATENT DOCUMENTS 10,557,096 B2 * 2/2020 Troetsch-Schaller ..... C08F 8/44
2011/0190182 A1 8/2011 Price et al.

OTHER PUBLICATIONS

International Preliminary Report on Patentability received for PCT Patent Application No. PCT/EP2019/077198, dated Apr. 29, 2021, 7 pages.
International Search Report and Written Opinion received for PCT Patent Application No. PCT/EP2019/077198, dated Dec. 6, 2019, 8 pages.

* cited by examiner

LUBRICANTS WITH A TERPOLYMER MADE OF DIESTER, OLEFIN AND ACRYLATE

CROSS-REFERENCE TO RELATED APPLICATIONS

This application is a national stage application (under 35 U.S.C. § 371) of PCT/EP2019/077198, filed Oct. 8, 2019, which claims benefit of European Application No. 18200690.8, filed Oct. 16, 2018, both of which are incorporated herein by reference in their entirety.

The invention relates to a lubricant comprising a terpolymer which comprises in polymerized form a diester selected from di($C_4$-$C_{22}$ alkyl)ester of maleic acid, fumaric acid, 2-methylmaleic acid, 2,3-dimethylmaleic acid, 2-methylfumaric acid, 2,3-dimethylfumaric acid, or mixtures thereof, an olefin selected from $C_6$-$C_{40}$ alkyl-1-ene, and an acrylate selected from $C_4$-$C_{40}$ alkyl (meth)acrylate. The invention further relates to the terpolymer, a process for preparing the terpolymer comprising the step of polymerizing the diester, the olefin, and the acrylate; and to a method for reducing friction between moving surfaces comprising the step of contacting the surfaces with the lubricant or with the terpolymer. Combinations of preferred embodiments with other preferred embodiments are within the scope of the present invention.

Object was to find a polymer for lubricants, which should overcome the drawbacks of the prior art. For example the terpolymer or the lubricant comprising the terpolymer should be liquid, should have a low pour point, a good miscibility with apolar base stocks, a good miscibility with polar base stocks, a good oxidation stability, a high viscosity index, a low friction coefficient, a low volatility, a high chemical stability, a high shear stability, a viscosity index, a low sludge, a high cleanliness, a good thickening efficiency, a high hydrolytic stability, or good cold flow properties. Preferably, the terpolymer or the lubricant comprising the terpolymer should provide a combination of several of such advantages.

Diester-Polymers, which comprise ethylenically unsaturated diester monomers, are often prepared by first polymerizing ethylenically unsaturated anhydrides (e.g. maleic acid anhydride), followed by a polymer modifying reaction in which alkanols are added for esterification of the anhydride. This usually results in only partial esterification of the anhydride, is expensive because it requires an additional reaction step, it requires removing of water with very long reaction times to ensure a complete di-esterification (especially when the polymer may not contain free carboxylate groups), and excess alkanol remains in the product and has to be removed in further purification steps. Thus, another goal was to find a polymer which is obtainable by one-step polymerization, or to avoid polymer modifying reactions.

The object was solved by a lubricant comprising a terpolymer which comprises in polymerized form a diester selected from di($C_4$-$C_{22}$ alkyl)ester of maleic acid, fumaric acid, 2-methylmaleic acid, 2,3-dimethylmaleic acid, 2-methylfumaric acid, 2,3-dimethylfumaric acid, or mixtures thereof, an olefin selected from $C_6$-$C_{40}$ alkyl-1-ene, and an acrylate selected from $C_4$-$C_{40}$ alkyl (meth)acrylate.

The object was also solved by the terpolymer, and by a method for reducing friction between moving surfaces comprising the step of contacting the surfaces with the lubricant or with the terpolymer.

The diester is preferably selected from linear or branched di($C_6$-$C_{14}$ alkyl)ester of maleic acid, fumaric acid, 2-methylmaleic acid, 2,3-dimethylmaleic acid, 2-methylfumaric acid, 2,3-dimethylfumaric acid, or mixtures thereof.

In another preferred form the diester is selected from linear or branched di($C_6$-$C_{14}$ alkyl)ester of maleic acid, fumaric acid, or mixtures thereof.

The diester is in particular selected from linear or branched di($C_6$-$C_{10}$ alkyl)ester of maleic acid, fumaric acid, or mixtures thereof.

In another particularly preferred form the diester is selected from linear or branched di(octyl)ester of maleic acid, fumaric acid, or mixtures thereof, such as di(2-ethylhexyl)ester of maleic acid, fumaric acid, or mixtures thereof.

In another particularly preferred form the diester is a mixture of di($C_6$-$C_{10}$ alkyl)ester of maleic acid with di($C_6$-$C_{10}$ alkyl)ester of fumaric acid, such as in a molar ratio of 99.1:0.1 to 60:40, preferably of 99:1 to 35:65, and in particular 99:1 to 90:10.

In another particularly preferred form the diester is a mixture of linear or branched di(octyl)ester of maleic acid with linear or branched di(octyl)ester of fumaric acid, such as in a molar ratio of 99.1:0.1 to 60:40, preferably of 99:1 to 35:65, and in particular 99:1 to 90:10.

The olefin is preferably selected from $C_6$-$C_{22}$ alkyl-1-ene, and in particular from $C_8$-$C_{14}$ alkyl-1-ene. The olefin may be linear or branched, preferably linear.

Examples thereof are 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene, of which preference is given to 1-decene, 1-dodecene, 1-tetradecene and 1-hexadecene and particular preference to 1-dodecene.

The acrylate is selected from $C_4$-$C_{40}$ alkyl (meth)acrylate. The acrylate is preferably selected from linear or branched $C_4$-$C_{22}$ alkyl (meth)acrylate. In another preferred form the acrylate is selected from linear or branched $C_6$-$C_{18}$ alkyl acrylate. In another preferred form the acrylate is selected from branched $C_6$-$C_{18}$ alkyl (meth)acrylate.

Examples of the acrylate are linear or branched butyl, pentyl, hexyl, heptyl, octyl, nonyl, decyl, undecyl, tridecyl, tetradecyl, pentadecyl, hexyldecyl, heptadecyl, octadecyl, 2-decyl-tetradecyl, 2-dodecyl-hexadecyl, or tetradecyl-octadecyl (meth)acrylates.

In a particularly preferred form the acrylate is 2-ethylhexyl acrylate or 2-ethylhexyl methacrylate. The terpolymer may comprise further monomers beside the diester, the olefin, and the acrylate, such as up to 15 wt %, preferably up to 8 wt %, and in particular up to 1 wt % of all monomers. Preferably, the terpolymer is free of further monomers. In another preferred form the terpolymer is free of anydrides of dicarbonic acids.

Examples for further monomers are vinyl aromatic compounds, such as styrene, alpha-methyl styrene, vinyl toluene or p-(tert-butyl) styrene;

acrylamide and methacrylamide;

itaconic acid and the imides and $C_1$ to $C_{10}$-alkyl esters thereof;

acrylonitrile and methacrylonitrile;

acrylates and methacrylates with functionalized chain such as dimethylaminoethylmethacrylate, dimethylaminopropylmethacrylate, diethylaminoethylmethacrylate, diethylaminopropylmethacrylate, dimethylaminoethyl-acrylate, dimethylaminopropylacrylate, diethylaminoethylacrylate, diethylaminopropylacrylate, tert-butylaminoethylmethacrylate, glycidylmethacrylate, phenoxyethylacrylate, phenoxyethylmethacrylate, 2-morpholinoethylmethacrylate, hydroxyethylmethacrylate, hydroxypropylmethacrylate;

acrylamide derivatives such as dimethyl-aminopropyl-methacrylamide, dimethylaminopropylacrylamide, dimethylacryl-amide, diethyl-acrylamide;

vinyl derivatives such as vinylimidazol, vinylpyrrolidone, vinylpyridine, 2- or 3-methyl-5-vinylpyridine, 2-methyl-5-vinylpyridine, 2-ethyl-5-vinylpyridine, 2,3-dimethyl-5-vinylpyridine, methyl-substituted quinolines and isoquinolines, 1-vinylimidazol, 2-methyl-1-vinylimidazol, N-vinylcaprolactam, N-vinylbutyrolactam;

vinylformamide, vinylethers, propylvinylether, butylvinylether and cyclohexylvinylether.

Other suitable further monomers are polyolefin-based macromonomers, preferably the macromonomers according to WO 2018/024563, such as macromonomers of the following formula

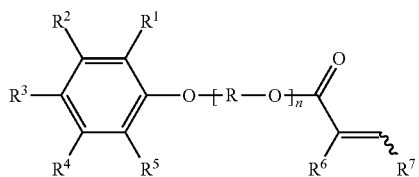

wherein $R^1$ to $R^5$ are each independently selected from the group consisting of H, $C_1$-$C_{20}$-Alkyl, $C_1$-$C_{20}$-Alkyloxy and $C_8$-$C_{3500}$-Polyisobutyl and $C_8$-$C_{3500}$-Polyisobutenyl, R is a 2 to 10 carbon atoms comprising alkylene group, $R^6$ is hydrogen or methyl, $R^7$ is hydrogen, methyl or $COOR^8$, $R^8$ is hydrogen or $C_1$-$C_{20}$-alkyl, and n is a positive integer from 1 to 50, with the proviso that at least of the residues $R^1$ to $R^5$ is a $C_8$-$C_{3500}$-polyisobutyl or $C_8$-$C_{3500}$-polyisobutenyl.

The molar ratio of the diester to the olefin is usually from 4:1 to 1:3, preferably from 3:1 to 1:2, and in particular from 2:1 to 1:1.5.

The molar ratio of the olefin to the acrylate is usually from 5:1 to 1:15, preferably from 4:1 to 1:10, and in particular from 3:1 to 1:7.

The molar ratio of the diester to the acrylate is usually from 5:1 to 1:15, preferably from 4:1 to 1:10, and in particular from 3:1 to 1:7.

The terpolymer comprises usually in polymerized form 5-40 mol % of the diester,
5-40 mol % of the olefin, and
20-90 mol % of the acrylate,
where the amounts of the monomers sum up to 85 to 100 mol %.

The terpolymer comprises usually in polymerized form
5-40 mol % of the diester selected from linear or branched di($C_6$-$C_{14}$ alkyl)ester of maleic acid, fumaric acid, 2-methylmaleic acid, 2,3-dimethylmaleic acid, 2-methylfumaric acid, 2,3-dimethyl-fumaric acid, or mixtures thereof,
5-40 mol % of the olefin selected from $C_6$-$C_{22}$ alkyl-1-ene, and
20-90 mol % of the acrylate is selected from linear or branched $C_4$-$C_{22}$ alkyl (meth)acrylate,
where the amounts of the monomers sum up to 85 to 100 mol %.

In another form the terpolymer comprises in polymerized form
20-40 mol % of the diester,
20-40 mol % of the olefin, and
20-50 mol % of the acrylate,
where the amounts of the monomers sum up to 85 to 100 mol %.

In another form the terpolymer comprises in polymerized form
12.5-30 mol % of the diester,
12.5-30 mol % of the olefin, and
40-70 mol % of the acrylate,
where the amounts of the monomers sum up to 85 to 100 mol %.

In another form the terpolymer comprises in polymerized form
2.5-20 mol % of the diester,
2.5-20 mol % of the olefin, and
55-85 mol % of the acrylate,
where the amounts of the monomers sum up to 90 to 100 mol %.

The terpolymer comprises usually in polymerized form
20-40 mol % of the diester selected from linear or branched di($C_6$-$C_{14}$ alkyl)ester of maleic acid, fumaric acid, 2-methylmaleic acid, 2,3-dimethylmaleic acid, 2-methylfumaric acid, 2,3-dimethyl-fumaric acid, or mixtures thereof,
20-40 mol % of the olefin selected from $C_6$-$C_{22}$ alkyl-1-ene, and
20-50 mol % of the acrylate is selected from linear or branched $C_4$-$C_{22}$ alkyl (meth)acrylate,
where the amounts of the monomers sum up to 85 to 100 mol %.

In another form the terpolymer comprises usually in polymerized form
12.5-30 mol % of the diester selected from linear or branched di($C_6$-$C_{14}$ alkyl)ester of maleic acid, fumaric acid, 2-methylmaleic acid, 2,3-dimethylmaleic acid, 2-methylfumaric acid, 2,3-dimethylfumaric acid, or mixtures thereof,
12.5-30 mol % of the olefin selected from $C_6$-$C_{22}$ alkyl-1-ene, and
40-70 mol % of the acrylate is selected from linear or branched $C_4$-$C_{22}$ alkyl (meth)acrylate,
where the amounts of the monomers sum up to 85 to 100 mol %.

The terpolymer comprises usually in polymerized form
2.5-20 mol % of the diester selected from linear or branched di($C_6$-$C_{14}$ alkyl)ester of maleic acid, fumaric acid, 2-methylmaleic acid, 2,3-dimethylmaleic acid, 2-methylfumaric acid, 2,3-dimethyl-fumaric acid, or mixtures thereof,
2.5-20 mol % of the olefin selected from $C_6$-$C_{22}$ alkyl-1-ene, and
55-85 mol % of the acrylate is selected from linear or branched $C_4$-$C_{22}$ alkyl (meth)acrylate,
where the amounts of the monomers sum up to 90 to 100 mol %.

The terpolymer has usually a number-average molecular weight Mn from 500 to 15 000 g/mol, preferably from 800 to 10 000 g/mol, and in particular from 1000 to 5 000 g/mol.

The terpolymer has usually a weight-average molecular weight Mw from 500 to 50 000 g/mol, preferably from 1 000 to 35 000 g/mol, and in particular from 2 000 to 20 000 g/mol.

The Mw and Mn may be determined by GPC on calibrated columns.

The terpolymer has usually a polydispersity ($M_w/M_n$) of at least 1, preferably in the range from 1.2 to 5, more preferably from 1.5 to 4, and most preferably from 1.8 to 3.

The terpolymer has usually a pour point below 10° C., preferably below 0° C., and in particular below −10° C. The pour point may be determined according to ASTM D 97.

The terpolymer has usually a cloud point of below 10° C., preferably below 0° C., and in particular below −10° C. The cloud point may be determined according to ISO 3015.

The terpolymer may be clear liquid at room temperature, e.g. at 25° C. Typically, in a clear liquid no turbidity is visible.

The terpolymer may be miscible with a polyalphaolefin having a kinematic viscosity at 100° C. of about 6 cSt. This miscibility may be determined in a weight ratio of 50:50 at room temperature, e.g. 25° C. for 24 h.

The terpolymer may have a kinematic viscosity at 40° C. from 100 to 50 000 mm$^2$/s (cSt), preferably from 300 to 10 000 mm$^2$/s, and in particular from 500 to 2500 mm$^2$/s.

The terpolymer may have a kinematic viscosity at 100° C. from 10 to 5000 mm$^2$/s (cSt), preferably from 30 to 3000 mm$^2$/s, and in particular from 50 to 2500 mm$^2$/s The kinematic viscosity may be determined according to ASTM D445.

The terpolymer may have a viscosity index of at least 100, preferably at least 130, and in particular of at least 170. The viscosity index may be determined according to ASTM D2270.

The invention also relates to a process for preparing the terpolymer comprising the step of polymerizing the diester, the olefin, and the acrylate, and optionally the further monomer. In another form the invention also relates to a process for preparing the terpolymer comprising the step of polymerizing
  the diester selected from di($C_4$-$C_{22}$ alkyl)ester of maleic acid, fumaric acid, 2-methylmaleic acid, 2,3-dimethylmaleic acid, 2-methylfumaric acid, 2,3-dimethylfumaric acid, or mixtures thereof,
  the olefin selected from $C_6$-$C_{40}$ alkyl-1-ene,
  the acrylate selected from $C_4$-$C_{40}$ alkyl (meth)acrylate, and
  optionally the further monomer.

The terpolymer is usually obtainable by polymerizing the diester, the olefin, and the acrylate, and optionally the further monomer.

The polymerization of the diester, the olefin, the acrylate, and optionally the further monomer maybe selected from solvent polymerization, emulsion polymerization, precipitation polymerization or bulk polymerization, preferably from solvent polymerization or bulk polymerization.

The monomer components can be polymerized neat, in emulsion or in solution. Preferably, the monomer components are polymerized neat. It is possible here to use a single monomer species or a mixture of several such monomer species for each monomer component. The polymerization reaction is generally conducted at standard pressure and under a protective gas, such as nitrogen. The polymerization temperatures are generally 50 to 250° C. Suitable polymerization reactors are in principle all customary continuous or batchwise apparatuses, for example a stirred tank, stirred tank cascade, tubular reactor or loop reactor. The polymerization reaction is generally conducted at a pressure up to 3 bar, preferably up to 2 bar, and in particular up to 1.5 bar. The polymerization reaction is in particular conducted at ambient pressure.

Typically, the polymerization is initiated by initiators that break down by a free-radical mechanism; suitable initiators for this purpose are air or oxygen of organic peroxides and/or hydroperoxides, and also organic azo compounds. Examples of useful organic peroxides or hydroperoxides include diisopropylbenzene hydroperoxide, cumene hydroperoxide, methyl isobutyl ketone peroxide, di-tert-butyl peroxide and tert-butyl perisononanoate. An example of a suitable organic azo compound is azobisisobutyronitrile ("AIBN"). In addition, it is possible to use suitable chain transfer agents in the polymerization as well, such as thio alcohols, aldehydes or ketones.

If solvents or emulsion media are used in the polymerization as well, the customary high-boiling inert liquids are useful for this purpose, such as aliphatic hydrocarbons, e.g. heptane, Shellsol® D70, white oil, lamp oil), aromatic hydrocarbons, e.g. ethylbenzene, diethylbenzenes, toluene, xylenes or corresponding technical hydrocarbon mixtures such as Shellsol®, Solvesso® or Solvent Naphtha.

In a preferred form the process for preparing the terpolymer comprises the step of polymerizing the diester, the olefin, the acrylate, and optionally the further monomer, in the presence of a chain transfer agent. Suitable chain transfer agents (also named regulator) in the sense of this invention are regulators which are terminating the growing of a polymer being incorporated as terminus of the polymer chain. Suitable chain transfer agents are saturated or unsaturated hydrocarbons, alcohols, thiols, ketones, aldehydes, amines, or hydrogen. Preferred chain transfer agents are hydrocarbons and thiols.

Among saturated and unsaturated hydrocarbons the chain transfer agents can be selected from pentane, hexane, cyclohexane, isododecane, propene, butene, pentene, cyclohexene, hexene, octene, gamma-terpinene, decen and dodecen, and from aromatic hydrocarbonds such as toluol, xylol, trimethyl-benzene, ethylbenzene, diethylbenzene, triethylbenzene, mixtures thereof.

Suitable ketones or aldehydes as chain transfer agents are aliphatic aldehydes or aliphatic ketones, such as regulators of the formula II

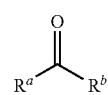

(II)

or mixtures thereof.

$R_a$ and $R_b$ are the same or different and are selected from hydrogen;
  $C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl; more preferably $C_1$-$C_4$-alkyl such as methyl, ethyl, n-propyl, isopropyl, n-butyl, isobutyl, sec-butyl and tert-butyl;
  $C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

The $R^a$ and $R^b$ radicals may also be covalently bonded to one another to form a 4- to 13-membered ring. For example, $R^a$ and $R^b$ together may form the following alkylene groups: —(CH$_2$)$_4$—, —(CH$_2$)$_5$—, —(CH$_2$)$_6$—, —(CH$_2$)$_7$—, —CH(CH$_3$)—CH$_2$—CH$_2$—CH(CH$_3$)— or —CH(CH$_3$)—CH$_2$—CH$_2$—CH$_2$—CH(CH$_3$)—.

Preferred ketones as chain transfer agents are acetone, methylethylketone, diethylketone and diamylketone. Preferred aldehydes as chain transfer agents are acetaldehyde, propionaldehyde, butanal and pentanal.

Among alcohols the chain transfer agents are selected from the group consisting of methanol, ethanol, propanol, isopropanol, butanol and pentanol.

Among thiols the chain transfer agents maybe selected from linear or branched aliphatic $C_1$-$C_{20}$ alkylthiols. In another form suitable thiols are organic thio compounds, such as primary, secondary, or tertiary aliphatic thiols, such as, ethanethiol, n-propanethiol, 2-propanethiol, n-butanethiol, tert-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as 2-hydroxyethanethiol, aromatic thiols, such as benzenethiol, ortho-, meta-, or para-methylbenzenethiol, mercaptoalkanoic acid and derivatives thereof, such as 6-methylheptyl 3-mercaptopropionate or 2-ethylhexyl 2-mercaptoethanoate.

Among amines the chain transfer agents are selected from primary, secondary, or tertiary amines, such as dialkyl amines or trialkyl amines. Examples for amines are propyl amine, dipropyl amine, dibutyl amine, triethyl amine.

The chain transfer agent is usually present at a concentration of 0.1 to 5 wt %, preferably from 0.15 to 2.5 wt %, and in particular form 0.2 to 1.9 wt %, based on the sum of the amounts of monomers.

The lubricant usually further comprises
a base oil selected from mineral oils, polyalphaolefins, polymerized and interpolymerized olefins, alkyl naphthalenes, alkylene oxide polymers, silicone oils, phosphate ester and carboxylic acid ester; and/or
a lubricant additive.

In one form the lubricant may comprise at least 10 wt %, preferably at least 30 wt % and in particular at least 60 wt % of the terpolymer.

In another form the lubricant may comprise 10-99 wt %, preferably 30-95 wt % and in particular at least 60-95 wt % of the terpolymer.

In another form the lubricant may comprise 1-90 wt %, preferably 5-50 wt % and in particular 20-50 wt % of the base oil.

In another form the lubricant may comprise at least 0.1 wt %, preferably at least 0.5 wt % and in particular at least 1 wt % of the terpolymer.

In another form the lubricant may comprise 0.1-20 wt %, preferably 0.1-15 wt % and in particular at least 0.1-10 wt % of the terpolymer.

In another form the lubricant may comprise 30-99.9 wt %, preferably 50-99 wt % and in particular 70-95 wt % of the base oil.

The lubricant may comprise up to 20 wt %, preferably up to 15 wt % and in particular up to 10 wt % of the lubricant additive.

In another form the lubricant may comprise 0.1-20 wt %, preferably 0.1-15 wt % and in particular at least 0.1-10 wt % of the lubricant additive.

Lubricants usually refers to composition which are capable of reducing friction between surfaces, such as surfaces of mechanical devices. A mechanical device may be a mechanism consisting of a device that works on mechanical principles. Suitable mechanical device are bearings, gears, joints and guidances. The mechanical device may be operated at temperatures in the range of −30 C to 80° C.

The base oil may selected from the group consisting of mineral oils (Group I, II or III oils), polyalphaolefins (Group IV oils), polymerized and interpolymerized olefins, alkyl naphthalenes, alkylene oxide polymers, silicone oils, phosphate esters and carboxylic acid esters (Group V oils). Preferably, the base oil is selected from Group I, Group II, Group III base oils according to the definition of the API, or mixtures thereof. Definitions for the base oils are the same as those found in the American Petroleum Institute (API) publication "Engine Oil Licensing and Certification System", Industry Services Department, Fourteenth Edition, December 1996, Addendum 1, December 1998. Said publication categorizes base oils as follows:

a) Group I base oils contain less than 90 percent saturates (ASTM D 2007) and/or greater than 0.03 percent sulfur (ASTM D 2622) and have a viscosity index (ASTM D 2270) greater than or equal to 80 and less than 120.

b) Group II base oils contain greater than or equal to 90 percent saturates and less than or equal to 0.03 percent sulfur and have a viscosity index greater than or equal to 80 and less than 120.

c) Group III base oils contain greater than or equal to 90 percent saturates and less than or equal to 0.03 percent sulfur and have a viscosity index greater than or equal to 120.

d) Group IV base oils contain polyalphaolefins. Polyalphaolefins (PAO) include known PAO materials which typically comprise relatively low molecular weight hydrogenated polymers or oligomers of alphaolefins which include but are not limited to C2 to about C32 alphaolefins with the $C_8$ to about C16 alphaolefins, such as 1-octene, 1-decene, 1-dodecene and the like being preferred. The preferred polyalphaolefins are poly-1-octene, poly-1-decene, and poly-1-dodecene.

e) Group V base oils contain any base oils not described by Groups I to IV. Examples of Group V base oils include alkyl naphthalenes, alkylene oxide polymers, silicone oils, and phosphate esters.

Synthetic base oils include hydrocarbon oils and halo-substituted hydrocarbon oils such as polymerized and interpolymerized olefins (e.g., polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic base oils. These are exemplified by polyoxyalkylene polymers prepared by polymerization of ethylene oxide or propylene oxide, and the alkyl and aryl ethers of polyoxyalkylene poly-mers (e.g., methyl-polyiso-propylene glycol ether having a molecular weight of 1000 or diphenyl ether of polyethylene glycol having a molecular weight of 1000 to 1500); and mono- and polycarboxylic esters thereof, for example, the acetic acid esters, mixed C3-C8 fatty acid esters and C13 oxo acid diester of tetraethylene glycol.

Silicon-based oils such as the polyalkyl-, polyaryl-, polyalkoxy- or polyaryloxysilicone oils and sili-cate oils comprise another useful class of synthetic base oils; such base oils include tetraethyl silicate, tetraisopropyl silicate, tetra-(2-ethylhexyl)silicate, tetra-(4-methyl-2-ethylhexyl) silicate, tetra-(p-tert-butyl-phenyl) silicate, hexa-(4-methyl-2-ethylhexyl)disiloxane, poly(methyl) siloxanes and poly (methylphenyl)siloxanes. Other synthetic base oils include liquid esters of phosphorous-containing acids (e.g., tricresyl phosphate, trioctyl phosphate, diethyl ester of decylphosphonic acid) and polymeric tetrahydrofurans.

Suitable lubricant additives may be selected from viscosity index improvers, polymeric thickeners, antioxidants, corrosion inhibitors, detergents, dispersants, anti-foam agents, dyes, wear protection additives, extreme pressure additives (EP additives), anti-wear additives (AW additives), friction modifiers, metal deactivators, pour point depressants.

The viscosity index improvers include high molecular weight polymers that increase the relative viscosity of an oil at high temperatures more than they do at low temperatures. Viscosity index improvers include polyacrylates, polymethacrylates, alkylmethacrylates, vinylpyrrolidone/methacrylate copolymers, poly vinylpyrrolidones, polybutenes, olefin copolymers such as an ethylene-propylene copolymer or a styrene-butadiene copolymer or polyalkene such as PIB, styrene/acrylate copolymers and polyethers, and combinations thereof. The most common VI improvers are methacrylate polymers and copolymers, acrylate polymers, olefin polymers and copolymers, and styrenebutadiene copolymers. Other examples of the viscosity index improver include polymethacrylate, polyisobutylene, alpha-olefin polymers, alpha-olefin copolymers (e.g., an ethylenepropylene copolymer), polyalkylstyrene, phenol condensates, naphthalene condensates, a styrenebutadiene copolymer and the like. Of these, polymethacrylate having a number average molecular weight of 10000 to 300000, and alpha-olefin polymers or alpha-olefin copolymers having a number average molecular weight of 1000 to 30000, particularly ethylene-alpha-olefin copolymers having a number average molecular weight of 1000 to 10000 are preferred. The viscosity index increasing agents can be added and used individually or in the form of mixtures, conveniently in an amount within the range of from 0.05 to 20.0% by weight, in relation to the weight of the base stock.

Suitable (polymeric) thickeners include, but are not limited to, polyisobutenes (PIB), oligomeric co-polymers (OCPs), polymethacrylates (PMAs), copolymers of styrene and butadiene, or high viscosity esters (complex esters).

Antioxidants include phenolic antioxidants such as hindered phenolic antioxidants or non-phenolic oxidation inhibitors.

Useful phenolic antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with alkyl groups having 6 carbon atoms or more and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic propionic ester derivatives. Bis-phenolic antioxidants may also be used in combination with the present invention. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic monoamines of the formula $R^8R^9R^{10}N$, where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$, where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to about 20 carbon atoms, and preferably contains from about 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present invention include: p,p'-dioctyldiphenylamine; t-octylphenyl-alpha-naphthylamine; phenyl-alphanaphthylamine; and p-octylphenyl-alpha-naphthylamine. Sulfurized alkyl phenols and alkali or alkaline earth metal salts thereof also are useful antioxidants.

Corrosion inhibitors may include various oxygen-, nitrogen-, sulfur-, and phosphorus-containing materials, and may include metal-containing compounds (salts, organometallics, etc.) and nonmetal-containing or ashless materials. Corrosion inhibitors may include, but are not limited to, additive types such as, for example, hydrocarbyl-, aryl-, alkyl-, arylalkyl-, and alkylarylversions of detergents (neutral, overbased), sulfonates, phenates, salicylates, alcoholates, carboxylates, salixarates, phosphites, phosphates, thiophosphates, amines, amine salts, amine phosphoric acid salts, amine sulfonic acid salts, alkoxylated amines, etheramines, polyetheramines, amides, imides, azoles, diazoles, triazoles, benzotriazoles, benzothiadoles, mercaptobenzothiazoles, tolyltriazoles (TTZ-type), heterocyclic amines, heterocyclic sulfides, thiazoles, thiadiazoles, mercaptothiadiazoles, dimercaptothiadiazoles (DMTD-type), imidazoles, benzimidazoles, dithiobenzimidazoles, imidazolines, oxazolines, Mannich reactions products, glycidyl ethers, anhydrides, carbamates, thiocarbamates, dithiocarbamates, polyglycols, etc., or mixtures thereof.

Detergents include cleaning agents that adhere to dirt particles, preventing them from attaching to critical surfaces. Detergents may also adhere to the metal surface itself to keep it clean and prevent corrosion from occurring. Detergents include calcium alkylsalicylates, calcium alkylphenates and calcium alkarylsulfonates with alternate metal ions used such as magnesium, barium, or sodium. Examples of the cleaning and dispersing agents which can be used include metal-based detergents such as the neutral and basic alkaline earth metal sulphonates, alkaline earth metal phenates and alkaline earth metal salicylates alkenylsuccinimide and alkenylsuccinimide esters and their borohydrides, phenates, salienius complex detergents and ashless dispersing agents which have been modified with sulphur compounds. These agents can be added and used individually or in the form of mixtures, conveniently in an amount within the range of from 0.01 to 1.0% by weight in relation to the weight of the base stock; these can also be high total base number (TBN), low TBN, or mixtures of high/low TBN.

Dispersants are lubricant additives that help to prevent sludge, varnish and other deposits from forming on critical surfaces. The dispersant may be a succinimide dispersant (for example N-substituted long chain alkenyl succinimides), a Mannich dispersant, an ester-containing dispersant, a condensation product of a fatty hydrocarbyl monocarboxylic acylating agent with an amine or ammonia, an alkyl amino phenol dispersant, a hydrocarbyl-amine dispersant, a polyether dispersant or a polyetheramine dispersant. In one embodiment, the succinimide dispersant includes a polyisobutylene-substituted succinimide, wherein the polyisobutylene from which the dispersant is derived may have a number average molecular weight of about 400 to about 5000, or of about 950 to about 1600. In one embodiment, the dispersant includes a borated dispersant. Typically, the borated dispersant includes a succinimide dispersant including a polyisobutylene succinimide, wherein the polyisobutylene from which the dispersant is derived may have a number average molecular weight of about 400 to about 5000. Borated dispersants are described in more detail above within the extreme pressure agent description.

Anti-foam agents may be selected from silicones, polyacrylates, and the like. The amount of anti-foam agent in the lubricant compositions described herein may range from ≥0.001 wt.-% to ≤0.1 wt.-% based on the total weight of the formulation. As a further example, an anti-foam agent may be present in an amount from about 0.004 wt.-% to about 0.008 wt.-%.

Suitable extreme pressure agent is a sulfur-containing compound. In one embodiment, the sulfur-containing compound may be a sulfurised olefin, a polysulfide, or mixtures thereof. Examples of the sulfurised olefin include a sulfurised olefin derived from propylene, isobutylene, pentene; an organic sulfide and/or polysulfide including benzyldisulfide; bis(chlorobenzyl) disulfide; dibutyl tetrasulfide; di-tertiary butyl polysulfide; and sulfurised methyl ester of oleic acid, a sulfurised alkylphenol, a sulfurised dipentene, a sulfurised terpene, a sulfurised Diels-Alder adduct, an alkyl sulphenyl N'N-dialkyl dithiocarbamates; or mixtures thereof. In one embodiment, the sulfurised olefin includes a sulfurised olefin derived from propylene, isobutylene, pentene or mixtures thereof. In one embodiment the extreme pressure additive sulfur-containing compound includes a dimercaptothiadiazole or derivative, or mixtures thereof. Examples of the dimercaptothiadiazole include compounds such as 2,5-dimercapto-1,3,4-thiadiazole or a hydrocarbyl-substituted 2,5-dimercapto-1,3,4-thiadiazole, or oligomers thereof. The oligomers of hydrocarbyl-substituted 2,5-dimercapto-1,3,4-thiadiazole typically form by forming a sulfur-sulfur bond between 2,5-dimercapto-1,3,4-thiadiazole units to form derivatives or oligomers of two or more of said thiadiazole units. Suitable 2,5-dimercapto-1,3,4-thiadiazole derived compounds include for example 2,5-bis(tert-nonyldithio)-1, 3,4-thiadiazole or 2-tert-nonyldithio-5-mercapto-1,3,4-thiadiazole. The number of carbon atoms on the hydrocarbyl substituents of the hydrocarbyl-substituted 2,5-dimercapto-1,3,4-thiadiazole typically include 1 to 30, or 2 to 20, or 3 to 16. Extreme pressure additives include compounds containing boron and/or sulfur and/or phosphorus. The extreme pressure agent may be present in the lubricant compositions at 0 wt.-% to about 20 wt.-%, or at about 0.05 wt.-% to about 10.0 wt.-%, or at about 0.1 wt.-% to about 8 wt.-% of the lubricant composition.

Examples of anti-wear additives include organo borates, organo phosphites such as didodecyl phosphite, organic sulfur-containing compounds such as sulfurized sperm oil or sulfurized terpenes, zinc dialkyl dithiophosphates, zinc diaryl dithiophosphates, phosphosulfurized hydrocarbons and any combinations thereof.

Friction modifiers may include metal-containing compounds or materials as well as ashless compounds or materials, or mixtures thereof. Metal-containing friction modifiers include metal salts or metal-ligand complexes where the metals may include alkali, alkaline earth, or transition group metals. Such metal-containing friction modifiers may also have low-ash characteristics. Transition metals may include Mo, Sb, Sn, Fe, Cu, Zn, and others. Ligands may include hydrocarbyl derivative of alcohols, polyols, glycerols, partial ester glycerols, thiols, carboxylates, carbamates, thiocarbamates, dithiocarbamates, phosphates, thiophosphates, dithiophosphates, amides, imides, amines, thiazoles, thiadiazoles, dithiazoles, diazoles, triazoles, and other polar molecular functional groups containing effective amounts of O, N, S, or P, individually or in combination. In particular, Mo-containing compounds can be particularly effective such as for example Mo-dithiocarbamates, Mo(DTC), Mo-dithiophosphates, Mo(DTP), Mo-amines, Mo (Am), Mo-alcoholates, Mo-alcohol-amides, and the like.

Ashless friction modifiers may also include lubricant materials that contain effective amounts of polar groups, for example, hydroxyl-containing hydrocarbyl base oils, glycerides, partial glycerides, glyceride derivatives, and the like. Polar groups in friction modifiers may include hydrocarbyl groups containing effective amounts of O, N, S, or P, individually or in combination. Other friction modifiers that may be particularly effective include, for example, salts (both ash-containing and ashless derivatives) of fatty acids, fatty alcohols, fatty amides, fatty esters, hydroxyl-containing carboxylates, and comparable synthetic long-chain hydrocarbyl acids, alcohols, amides, esters, hydroxy carboxylates, and the like. In some instances, fatty organic acids, fatty amines, and sulfurized fatty acids may be used as suitable friction modifiers. Examples of friction modifiers include fatty acid esters and amides, organo molybdenum compounds, molybdenum dialkylthiocarbamates and molybdenum dialkyl dithiophosphates.

Suitable metal deactivators include benzotriazoles and derivatives thereof, for example 4- or 5-alkylbenzotriazoles (e.g. triazole) and derivatives thereof, 4,5,6,7-tetrahydrobenzotriazole and 5,5'-methylenebisbenzotriazole; Mannich bases of benzotriazole or triazole, e.g. 1-[bis(2-ethylhexyl) aminomethyl) triazole and 1-[bis(2-ethylhexyl) aminomethyl)benzotriazole; and alkoxyalkylbenzotriazoles such as 1-(nonyloxymethyl)benzotriazole, 1-(1-butoxyethyl) benzotriazole and 1-(1-cyclohexyloxybutyl) triazole, and combinations thereof. Additional non-limiting examples of the one or more metal deactivators include 1,2,4-triazoles and derivatives thereof, for example 3-alkyl(or aryl)-1,2,4-triazoles, and Mannich bases of 1,2,4-triazoles, such as 1-[bis (2-ethylhexyl) aminomethyl-1,2,4-triazole; alkoxyalkyl-1,2, 4-triazoles such as 1-(1-butoxyethyl)-1,2,4-triazole; and acylated 3-amino-1,2,4-triazoles, imidazole derivatives, for example 4,4'-methylenebis(2-undecyl-5-methylimidazole) and bis[(N-methyl)imidazol-2-yl]carbinol octyl ether, and combinations thereof. Further non-limiting examples of the one or more metal deactivators include sulfur-containing heterocyclic compounds, for example 2-mercaptobenzothiazole, 2,5-dimercapto-1,3,4-thia-diazole and derivatives thereof; and 3,5-bis[di(2-ethylhexyl) aminomethyl]-1,3,4-thiadiazolin-2-one, and combinations thereof. Even further non-limiting examples of the one or more metal deactivators include amino compounds, for example salicylidenepropylenediamine, salicylami-noguanidine and salts thereof, and combinations thereof. The one or more metal deactivators are not particularly limited in amount in the composition but are typically present in an amount of from about 0.01 to about 0.1, from about 0.05 to about 0.01, or from about 0.07 to about 0.1, wt.-% based on the weight of the composition. Alternatively, the one or more metal deactivators may be present in amounts of less than about 0.1, of less than about 0.7, or less than about 0.5, wt.-% based on the weight of the composition.

Pour point depressants (PPD) include polymethacrylates, alkylated naphthalene derivatives, and combinations thereof. Commonly used additives such as alkylaromatic polymers and polymethacrylates are also useful for this purpose. Typically, the treat rates range from 0.001 wt.-% to 1.0 wt.-%, in relation to the weight of the base stock.

Demulsifiers include trialkyl phosphates, and various polymers and copolymers of ethylene glycol, ethylene oxide, propylene oxide, or mixtures thereof.

Examples for lubricants are axle lubrication, medium and heavy duty engine oils, industrial engine oils, marine engine oils, automotive engine oils, crankshaft oils, compressor oils, refrigerator oils, hydrocarbon compressor oils, very low-temperature lubricating oils and fats, high temperature lubricating oils and fats, wire rope lubricants, textile machine oils, refrigerator oils, aviation and aerospace lubricants, aviation turbine oils, transmission oils, gas turbine oils, spindle oils, spin oils, traction fluids, transmission oils, plastic transmission oils, passenger car transmission oils, truck transmission oils, industrial transmission oils, industrial gear oils, insulating oils, instrument oils, brake fluids, transmission liquids, shock absorber oils, heat distribution medium oils, transformer oils, fats, chain oils, minimum quantity lubricants for metalworking operations, warm and cold working oils, oil for water-based metalworking liquids, oil for neat oil metalworking fluids, oil for semi-synthetic metalworking fluids, oil for synthetic metalworking fluids, drilling detergents for soil exploration, hydraulic oils, in biodegradable lubricants or lubricating greases or waxes, chain saw oils, release agents, molding fluids, gun, pistol and rifle lubricants or watch lubricants and food grade approved lubricants.

The invention further relates to a method for reducing friction between moving surfaces comprising the step of contacting the surfaces with the lubricant or with the terpolymer.

The friction may be determined by measuring the friction coefficient at 25% slide roll ratio (SRR) using mini-traction machine (MTM) measurements at 70° C. and 1 GPa.

The terpolymer according to the invention may be used for many purposes in lubricants, e.g. for increasing the viscosity index of the lubricant, for thickening of the lubricant, for improving the coefficient of friction of the lubricant, for reducing wear, or as a base stock for the lubricant.

EXAMPLES

DOM: bis (2-ethylhexyl) maleate, also known as "dioctyl maleate", contains about 10-40 mol % of bis(2-ethylhexyl) fumarate.

DOD: 1-dodecene, purity >95 wt %, 1-5 wt % 1-decene/1-tetradecene.

Heptadecyl acrylate: acrylate based on mixture of branched $C_{17}$ alcanols, commercially available from BASF SE.

Heptadecyl methacrylate: methacrylate based on mixture of branched $C_{17}$ alcanols, commercially available from BASF SE.

Lauryl acrylate: a 60:40 mixture of $C_{12}:C_{14}$ alkyl acrylates.

2-Propylheptyl acrylate: commercially available from BASF SE.

2-Propylheptyl methacrylate: commercially available from BASF SE.

The molecular weight number distribution Mn and the molecular weight weight distribution Mw were determined via GPC. The polydispersity was calculated as PD=(Mw/Mn). The GPC analysis was made with a RI detector, a PLgel MIXED-B column (column temperature 35° C.) and THF with 0.1% trifluor acetic acid as elution medium. The calibration was done with very narrow distributed polystyrene standards from the Polymer Laboratories with a molecular weights M=from 580 until 6.870.000 g/mol.

The Cloud Point CP was determined according to ISO 3015. The Pour Point PP was determined according to ASTM D 97. The amounts of monomomers which are present in polymerized form in the polymer was determined by H-NMR.

Examples 1 to 17: Polymerization

The terpolymer which contained the monomers dioctyl maleate ("DOM"), 1-dodecene ("DOD") and 2-ethylhexyl acrylate as described in Table 1 in a molar ratio of 1:1:1 was prepared as follows (see Example 2). The other polymers were prepared in the same manner. It was also possible to add 1/3 of the acrylate in the beginning to the DOM and DOD.

In a 2 Liter vessel with anchor stirrer were introduced as precharge the diester DOM (645 g) and the olefin DOD (315 g). The mixture was gassed with $N_2$ and was heated until 155° C. As soon as the temperature was achieved about 85% of the initiator ditert. butylperoxide and 2-ethylhexyl acrylate (345.8 g) were added into the reaction mixture separately for 3 hours. Afterwards the system was kept under 1 hour at 145° C. Finally, the rest of the initiator ditert.-butylperoxide was added in one portion under 145° C. and after 2 hours the polymerization is finished. In total 1.41 weight % (based on the total amount of monomers) of the initiator was added. The product was yellowish and low viscous with solid contents >99.5 wt %. If the solid content was below 99 wt % a further clean step could be made, which could be either vacuum distillation at 145° C. or simply stripping with $N_2$ at 145° C. and room pressure conditions.

TABLE 1

Composition and properties.

| Ex. | Acrylate | Ratio | Mn [g/mol] | Mw [g/mol] | PD | PP [° C.] | CP [° C.] |
|---|---|---|---|---|---|---|---|
| 1 | n-butyl acrylate | 1:1:2 | 3720 | 9700 | 2.6 | −24 | −55 |
| 2 | 2-ethylhexyl acrylate | 1:1:1 | 2480 | 5270 | 2.1 | −33 | −64 |
| 3 | 2-ethylhexyl acrylate | 1:1:0.5 | 2040 | 3920 | 1.9 | −33 | −61 |
| 4 | 2-ethylhexyl acrylate | 1:1:3 | 2860 | 7610 | 2.7 | −24 | −55 |
| 5 | 2-ethylhexyl acrylate | 1:1:6 | 3720 | 13700 | 3.7 | −27 | −58 |
| 6 | 2-ethylhexyl acrylate | 1.75:1:0.5 | 1440 | 3050 | 2.1 | −30 | −61 |
| 7 | 2-ethylhexyl methacrylate | 1:1:1 | 1710 | 3770 | 2.2 | −33 | −61 |
| 8 | 3-propylheptyl acrylate | 1:1:1 | 2430 | 4910 | 2.0 | −27 | −10 |
| 9 | 3-propylheptyl methacrylate | 1:1:1 | 1710 | 3600 | 2.1 | −33 | −60 |
| 10 | Lauryl acrylate | 1:1:1 | 2750 | 6070 | 2.2 | −24 | −23 |
| 11 | Lauryl acrylate | 1:1:2 | 3400 | 10700 | 3.1 | −12 | −14 |
| 12 | Lauryl methacrylate | 1:1:1 | 1950 | 4640 | 2.4 | −36 | −61 |
| 13 | Lauryl methacrylate | 1:1:3 | 3210 | 15900 | 4.9 | −21 | −50 |
| 14 | Isoheptadecyl acrylate | 1:1:1 | 2610 | 5360 | 2.1 | −27 | −57 |
| 15 | Isoheptadecyl acrylate | 1.5:1:0.5 | 1650 | 3600 | 2.2 | −30 | −58 |
| 16 | Isoheptadecyl acrylate | 1:1:5 | 2810 | 11400 | 4.1 | −21 | −50 |
| 17 | Isoheptadecyl methacrylate | 1:1:1 | 1880 | 4030 | 2.1 | −30 | −13 |

"Ratio" is the molar ratio diester:olefin:acrylate

The results demonstrated that all terpolymers were liquid at room temperature and had a pour point below 25° C. The results further indicate that all terpolymers tend to have good low temperature characteristics because of their low cloud point.

Example 18: Viscosity and Appearance

The Kinematic Viscosity at 40° C. (KV40) and at 100° C. (KV100) were determined according to ASTM D 445 and the values given as [mm²/s]. The Viscosity Index (VI) was determined according to ASTM D 2270. The appearance of the terpolymers was determined visually.

The results demonstrated that the terpolymers have a desired high kinematic viscosity, as well as a desired high viscosity index.

TABLE 2

Viscosities

| Ex. | Acrylate | Ratio | KV40 | KV100 | VI | Appearance |
|---|---|---|---|---|---|---|
| 1 | n-butyl acrylate | 1:1:2 | 2380 | 174 | 188 | Clear |
| 2 | 2-ethylhexyl acrylate | 1:1:1 | 1121 | 95 | 172 | Clear |
| 3 | 2-ethylhexyl acrylate | 1:1:0.5 | 1003 | 82 | 161 | Clear |
| 4 | 2-ethylhexyl acrylate | 1:1:3 | 1946 | 145 | 180 | Clear |
| 5 | 2-ethylhexyl acrylate | 1:1:6 | 4790 | 305 | 205 | Clear |
| 6 | 2-ethylhexyl acrylate | 1.75:1:0.5 | 1078 | 81 | 152 | Clear |
| 7 | 2-ethylhexyl methacrylate | 1:1:1 | 1007 | 73 | 144 | Clear |
| 8 | 3-propylheptyl acrylate | 1:1:1 | 1460 | 111 | 169 | Clear |
| 9 | 3-propylheptyl methacrylate | 1:1:1 | 794 | 64 | 147 | Clear |
| 10 | Lauryl acrylate | 1:1:1 | 1037 | 91 | 173 | Clear |
| 11 | Lauryl acrylate | 1:1:2 | 1571 | 143 | 200 | Clear |
| 12 | Lauryl methacrylate | 1:1:1 | 612 | 57 | 159 | Clear |
| 13 | Lauryl methacrylate | 1:1:3 | 3886 | 256 | 198 | Clear |
| 14 | Isoheptadecyl acrylate | 1:1:1 | 1559 | 111 | 162 | Clear |
| 15 | Isoheptadecyl acrylate | 1.5:1:0.5 | 1086 | 82 | 152 | Clear |
| 16 | Isoheptadecyl acrylate | 1:1:5 | 4507 | 278 | 196 | Clear |
| 17 | Isoheptadecyl methacrylate | 1:1:1 | 1034 | 75 | 144 | Clear |

Example 19: Miscibility with Polyalphaolefins

The terpolymers were mixed with polyalphaolefine having a kinematic viscosity at 100° C. of about 6 cSt in a weight ratio of 50:50 at room temperature and mixed at room temperature by rolling for 12 hours. The mixtures' appearance was observed after homogenization and again after 24 hours. The copolymer is deemed compatible with the polyalphaolefine when no phase separation was observed after 24 hours.

The results in Table 3 demonstrated that the terpolymers a miscible with very unpolar low viscosity polyalphaolefines (typically based on poly(1-decen)).

TABLE 3

Miscibility with PAO-6 (50:50 vol %)

| Ex. | Acrylate | Ratio | Miscible |
|---|---|---|---|
| 2 | 2-ethylhexyl acrylate | 1:1:1 | Yes |
| 4 | 2-ethylhexyl acrylate | 1:1:3 | Yes |
| 7 | 2-ethylhexyl methacrylate | 1:1:1 | Yes |
| 10 | Lauryl acrylate | 1:1:1 | Yes |
| 12 | Lauryl methacrylate | 1:1:1 | Yes |
| 13 | Lauryl methacrylate | 1:1:3 | Yes |
| 16 | Isoheptadecyl acrylate | 1:1:5 | Yes |

Example 20: Thermal Oxidative Stability

The thermal oxidative stability RPVOT was tested according to ASTM D2272. This standard test utilizes an oxygen-pressured vessel to evaluate the oxidation stability oils in the presence of water and a copper catalyst coil at 150° C. The time (minutes) was measured until the pressure decreases for 175 kPa below the maximum. The longer it takes, the more resistant the oil is against oxidation. All samples contained 0.5 wt % of the Irganox® L06, an octylated phenylalpha-naphthylamine commercially available from BASF SE.

TABLE 4

| Ex. | Acrylate | Ratio | RPVOT [min] |
|---|---|---|---|
| 2 | 2-ethylhexyl acrylate | 1:1:1 | 1529 |
| 3 | 2-ethylhexyl acrylate | 1:1:0.5 | 1319 |
| 8 | 3-propylheptyl acrylate | 1:1:1 | 1078 |
| 10 | Lauryl acrylate | 1:1:1 | 1123 |
| 11 | Lauryl acrylate | 1:1:2 | 2083 |

TABLE 4-continued

| Ex. | Acrylate | Ratio | RPVOT [min] |
|---|---|---|---|
| 13 | Lauryl methacrylate | 1:1:3 | 1199 |
| 14 | Isoheptadecyl acrylate | 1:1:1 | 702 |

Example 21: Lubricant Formulations

The lubricant formulations A to E were prepared by mixing the components according Table 5. The lubricant formulations are suitable as gear oils.

The data demonstrated that lubricant formulations combine excellent properties, such as high viscosity index, a low pour point, oxidative stability, and a low shear loss.

TABLE 5

|  | A | B | C | D | E |
|---|---|---|---|---|---|
| Terpolymer type | Ex. 2 | Ex. 4 | Ex. 5 | Ex. 4 | Ex. 4 |
| Terpolymer amount | 79.8% | 66.2% | 57.4% | 66.2% | 68.1% |
| PAO-6 | 17.5% | 31.2% | 39.9% | — | 19.5% |
| Mineral Oil | — | — | — | 31.2% | — |
| Synative ® ES DPHA | — | — | — | — | 9.7% |
| HiTEC ® 307 | 2.7% | 2.7% | 2.7% | 2.7% | 2.7% |
| KV40 [mm$^2$/s] | 323 | 311 | 325 | 313 | 303 |
| KV100 [mm$^2$/s] | 34 | 35 | 38 | 35 | 35 |
| VI | 149 | 157 | 168 | 155 | 162 |
| Pour Point [° C.] | −42 | −42 | −39 | −30 | −45 |
| ASTM D2893A | 13.4% | 7.0% | 2.0% | 6.8% | 5.5% |
| KRL100 h | <1% | <1% | 8.9% | <1% | <1% |

HiTEC ® 307: An industrial gear oil additive package, clear dark amber liquid, KV 100 13 cSt, commercially available from Afton Chemical Corp., USA.
Synative ® ES DPHA: A base oil made of di-(2-propylheptyl) adipate, commercially available from BASF SE, Germany.
PAO-6: A polyalphaolefin base oil, KV100 6 cSt.
Mineral Oil: a mineral oil from Group III base oils, KV 100 6 cSt.
ASTM D2893A: This test method is widely used to determine the oxidation stability of extreme pressure lubricating fluids, gear oils, and mineral oils. The oil sample was subjected to a temperature of 121° C. in the presence of dry air for 312 h. The oil was then tested for increase in KV100 and the result was given as percentage of increase.
KRL 100 h: This test method is used to evaluate the shear loss, and was calculated by the KV100 before and after the test according to CEC L-45-99.

The invention claimed is:

1. A lubricant comprising a terpolymer which comprises in polymerized form
   5 to 40 mol % of a diester selected from the group consisting of di(C$_6$-C$_{14}$ alkyl)ester of maleic acid, fumaric acid, 2-methylmaleic acid, 2,3-dimethylmaleic acid, 2-methylfumaric acid, 2,3-dimethylfumaric acid, and mixtures thereof,
   5 to 40 mol % of an olefin selected from 1-decene, 1-undecene, 1-dodecene, 1-tridecene, 1-tetradecene, 1-pentadecene, 1-hexadecene, 1-heptadecene, 1-octadecene, 1-nonadecene and 1-eicosene, and
   20 to 90 mol % of an acrylate selected from the group consisting of linear or branched octyl, nonyl, decyl, undecyl, tridecyl, tetradecyl, pentadecyl, hexyldecyl, heptadecyl, octadecyl, 2-decyl-tetradecyl, 2-dodecyl-hexadecyl, tetradecyl-octadecyl (meth)acrylates, and mixtures thereof;
   where mol % values are based on the terpolymer and sum up to 85 to 100 mol %.

2. The lubricant according to claim 1 where the diester is selected from the group consisting of di(2-ethylhexyl)ester of maleic acid, fumaric acid, and mixtures thereof.

3. The lubricant according to claim 1 where the diester is selected from the group consisting of linear or branched di(C$_6$-C$_{14}$ alkyl)ester of maleic acid, 2-methylmaleic acid, 2,3-dimethylmaleic acid, 2-methylfumaric acid, 2,3-dimethylfumaric acid, or mixtures thereof.

4. The lubricant according to claim 1 where the molar ratio of the diester to the olefin is from 3:1 to 1:2.

5. The lubricant according to claim 1 where the diester is a mixture of di(C$_6$-C$_{10}$ alkyl)ester of maleic acid with di(C$_6$-C$_{10}$ alkyl)ester of fumaric acid.

6. The lubricant according to claim 1 where the terpolymer has a number-average molecular weight Mn from 500 to 15 000 g/mol.

7. The lubricant according to claim 1 where the terpolymer has a pour point below 10° C.

8. The lubricant according to claim 1 where the terpolymer has a cloud point of below 10° C.

9. The lubricant according to claim 1 where the terpolymer has a pour point below −10° C. and a cloud point of below −10° C.

10. The lubricant according to claim 1 where the terpolymer is miscible with a polyalphaolefine having a kinematic viscosity at 100° C. of about 6 cSt.

11. The lubricant according to claim 1, further comprising
    a base oil selected from the group consisting of mineral oils, polyalphaolefins, polymerized and interpolymerized olefins, alkyl naphthalenes, alkylene oxide polymers, silicone oils, phosphate ester and carboxylic acid ester; and/or
    a lubricant additive.

12. A terpolymer which comprises in polymerized form
    5 to 40 mol % of a diester selected from the group consisting of di(C$_6$-C$_{14}$ alkyl)ester of maleic acid, fumaric acid, 2-methylmaleic acid, 2,3-dimethylmaleic acid, 2-methylfumaric acid, 2,3-dimethylfumaric acid, and mixtures thereof,
    5 to 40 mol % of an olefin selected from 1-decene, 1-undecene, 1-dodecene, 1-tridecene, 1-tetradecene, 1-pentadecene, 1-hexadecene, 1-heptadecene, 1-octadecene, 1-nonadecene and 1-eicosene, and
    20 to 90 mol % of an acrylate selected from the group consisting of linear or branched octyl, nonyl, decyl, undecyl, tridecyl, tetradecyl, pentadecyl, hexyldecyl, heptadecyl, octadecyl, 2-decyl-tetradecyl, 2-dodecyl-hexadecyl, tetradecyl-octadecyl (meth)acrylates, and mixtures thereof,
    where mol % values are based on the terpolymer and sum up to 85 to 100 mol %.

13. A method for reducing friction between moving surfaces comprising the step of contacting the surfaces with the lubricant as defined in claim 1.

14. A method for reducing friction between moving surfaces comprising the step of contacting the surfaces with the terpolymer as defined in claim 12.

15. The lubricant according to claim 1, wherein the acrylate is 2-ethylhexyl acrylate or 2-ethylhexyl methacrylate.

16. The lubricant according to claim 1, wherein the terpolymer has a weight-average molecular weight from 2000 to 20 000 g/mol.

17. The lubricant according to claim 1, wherein the olefin is selected from the group consisting of 1-decene, 1-undecene, 1-dodecene, 1-tridecene, 1-tetradecene, 1-pentadecene, and 1-hexadecene.

18. The terpolymer according to claim 12, wherein the olefin is selected from the group consisting of 1-decene, 1-undecene, 1-dodecene, 1-tridecene, 1-tetradecene, 1-pentadecene, and 1-hexadecene.

* * * * *